United States Patent
Kawasaki

(10) Patent No.: US 8,712,458 B2
(45) Date of Patent: Apr. 29, 2014

(54) RADIO COMMUNICATION SYSTEM, BASE STATION APPARATUS, TERMINAL APPARATUS, AND RADIO COMMUNICATION METHOD FOR RADIO COMMUNICATION SYSTEM

(75) Inventor: Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 13/238,643

(22) Filed: Sep. 21, 2011

(65) Prior Publication Data

US 2012/0009967 A1    Jan. 12, 2012

Related U.S. Application Data

(63) Continuation of application No. PCT/JP2009/001263, filed on Mar. 23, 2009.

(51) Int. Cl.
  *H04B 7/00* (2006.01)
  *H04W 72/00* (2009.01)
  *H04W 68/00* (2009.01)

(52) U.S. Cl.
  USPC ............ 455/509; 455/450; 455/447; 455/448

(58) Field of Classification Search
  CPC .................................................... H04W 72/04
  USPC ............ 455/550.1, 509, 450, 452.1, 451, 453
  See application file for complete search history.

(56) References Cited

U.S. PATENT DOCUMENTS 8,160,022 B2    4/2012 Mazawa et al.
8,239,635 B2 *  8/2012 Lev et al. ...................... 711/147
8,412,248 B2 *  4/2013 Fukui et al. ................... 455/509
2007/0002898 A1 1/2007 Boariu et al.
2008/0069046 A1 3/2008 Ishii et al.
2008/0089286 A1* 4/2008 Malladi et al. ............... 370/330
2009/0061778 A1* 3/2009 Vrzic et al. .................... 455/62
2009/0168711 A1 7/2009 Fukuoka et al.

(Continued)

FOREIGN PATENT DOCUMENTS

CN    101228725    7/2008
JP    2002-44002    2/2002

(Continued)

OTHER PUBLICATIONS

International Search Report issued for corresponding International Patent Application No. PCT/JP2009/001263, mailed Apr. 28, 2009.

(Continued)

*Primary Examiner* — Tilahun B Gesesse
(74) *Attorney, Agent, or Firm* — Myers Wolin, LLC

(57) ABSTRACT

A radio communication system including: a base station apparatus; and a terminal apparatus, wherein the base station apparatus and terminal apparatus performs radio communication, the base station apparatus includes: a scheduler which divides a radio frequency band used for the radio communication into first and second sub-bands of which respective bandwidths are different, assigns the divided first or second sub-band for transmitting user data to the terminal apparatus or for transmitting the user data from the terminal apparatus, and generates assignment information indicating which of the first or second sub-band is assigned to each terminal apparatus; and a transmitter which transmits the assignment information to the terminal apparatus, and the terminal apparatus includes a receiver which receives the assignment information.

13 Claims, 12 Drawing Sheets

(56) References Cited

U.S. PATENT DOCUMENTS

| | | | |
|---|---|---|---|
| 2009/0219873 A1 | 9/2009 | Higuchi et al. | |
| 2010/0142453 A1 | 6/2010 | Harada et al. | |
| 2010/0246559 A1* | 9/2010 | Ogawa et al. | 370/345 |

FOREIGN PATENT DOCUMENTS

| | | |
|---|---|---|
| JP | 2007-300505 | 11/2007 |
| JP | 2008-245141 | 10/2008 |
| JP | 2008-289114 | 11/2008 |
| JP | 2008-295032 | 12/2008 |
| WO | 2005/109787 | 11/2005 |
| WO | 2007/108473 | 9/2007 |
| WO | 2007/119591 | 10/2007 |
| WO | 2007/148704 | 12/2007 |

OTHER PUBLICATIONS

3GPP TS 36.213 V8.3.0 (May 2008); 3rd Generation Partnership Project; Technical Specification Group Radio Access Network; "Evolved Universal Terrestrial Radio Access (E-UTRA); Physical layer procedures", (Release 8); Dated May 2008.

Notice of Preliminary Rejection issued for corresponding Korean Patent Application No. 10-2011-7022107, mailed Jan. 9, 2013, with English translation.

Notification of Reason for Rejection issued for corresponding Japanese Patent Application No. 2011-505645 dispatched on Jun. 19, 2012 with English translation.

First Notification of Office Action issued for corresponding Chinese Patent Application No. 200980158252.4, issued Aug. 22, 2013, with English translation.

* cited by examiner

RADIO COMMUNICATION SYSTEM 1

B0   B1   B2   B3   B4   B5

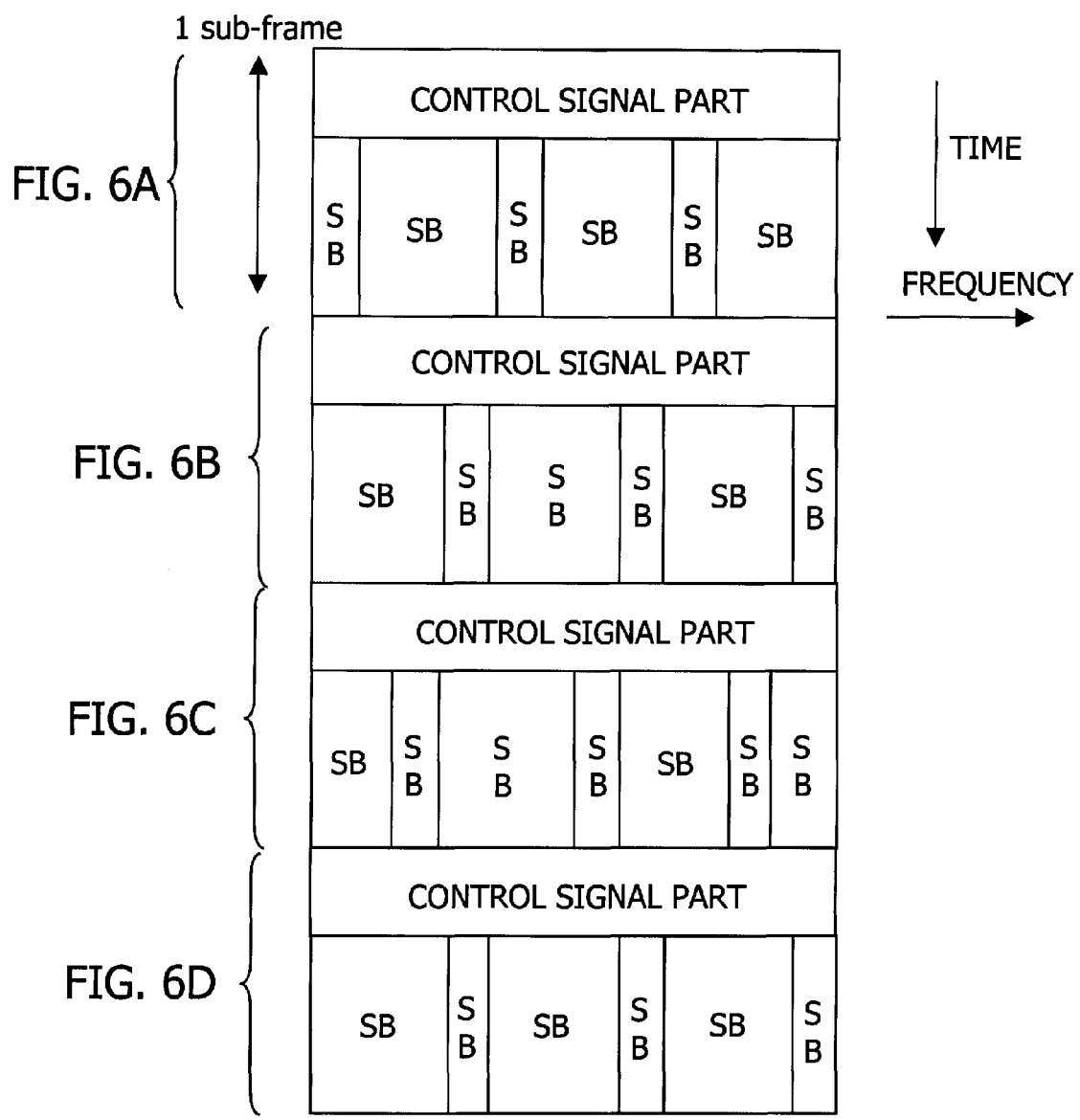

RADIO COMMUNICATION SYSTEM, BASE STATION APPARATUS, TERMINAL APPARATUS, AND RADIO COMMUNICATION METHOD FOR RADIO COMMUNICATION SYSTEM

CROSS-REFERENCE TO RELATED APPLICATION

This application is a continuation of International Application No. PCT/JP2009/001263, filed on Mar. 23, 2009, now pending, the contents of which are herein wholly incorporated by reference.

TECHNICAL FIELD

The embodiments discussed herein are related to a radio communication system, a base station apparatus, a terminal apparatus, and a radio communication method for the radio communication system.

BACKGROUND ART

In an LTE (Long Term Evolution) system, which is one of the next generation mobile communication systems of which specifications are being finalized by the 3GPP standardization group and of which commercialization is expected in 2010 to 2011 and later, the radio transmission bandwidth in the downlink direction is divided into sub-bands having a same width (for example, Non-patent Document 1). User data for each terminal apparatus is transmitted using one or a plurality of sub-bands. If user data for a terminal apparatus is assigned to a plurality of sub-bands, these sub-bands are arranged continuously or discontinuously on the frequency axis.

In an LTE system, information on association of user data and a sub-band used for the user data is expressed as a bit map. FIG. 10A illustrates a configuration example of a sub-frame, and FIG. 10B is an example of a bit map. In the example of FIG. 10A and FIG. 10B, there are ten sub-bands in total, and the third and fourth sub-bands from the left ("Y" in FIG. 10A) are used for a terminal apparatus. A bit map is included in a control signal, and a resource thereof is assigned to the control channel area of the sub-frame (e.g. "X" in FIG. 10A).

FIG. 11A and FIG. 11B illustrate a relationship between a radio transmission bandwidth and sub-bands. If the radio transmission bandwidth becomes wider than the case of FIG. 11A, the total number of sub-bands increases. If the total number of sub-bands increases, a bit map length increases, and the information volume of the control signal increases compared with the case of FIG. 11A. To solve this problem, in the LTE system, if the radio transmission bandwidth increases, the bandwidth of each sub-band is increased accordingly so that the bit map length does not increase. FIG. 12A to FIG. 12C illustrate an example when the bandwidth of each sub-band increases as the radio transmission bandwidth increases, with keeping the bit map length constant. Non-patent Document 1: 3GPP TS36.213V8.3.0

DISCLOSURE OF THE INVENTION

Problems to be Solved by the Invention

However the sizes of user data vary, and if the data volume of user data which a base station apparatus or terminal apparatus transmits is sufficiently smaller than the size of the sub-band, the utilization efficiency of the sub-bands drops.

Means for Solving the Problem

According to an aspect of the invention, a radio communication system including: a base station apparatus; and a terminal apparatus, wherein the base station apparatus and terminal apparatus performs radio communication, the base station apparatus includes: a scheduler which divides a radio frequency band used for the radio communication into first and second sub-bands of which respective bandwidths are different, assigns the divided first or second sub-band for transmitting user data to the terminal apparatus or for transmitting the user data from the terminal apparatus, and generates assignment information indicating which of the first or second sub-band is assigned to each terminal apparatus; and a transmitter which transmits the assignment information to the terminal apparatus, and the terminal apparatus includes a receiver which receives the assignment information.

Furthermore, according to an aspect of the invention, a base station apparatus for performing radio communication with a terminal apparatus, the base station apparatus including: a scheduler which divides a radio frequency band used for the radio communication into first and second sub-bands of which respective bandwidths are different, assigns the divided first or second sub-band for transmitting user data to the terminal apparatus or for transmitting the user data from the terminal apparatus, and generates assignment information indicating which of the first or second sub-band is assigned to each terminal apparatus; and a transmitter which transmits the assignment information to the terminal apparatus.

Furthermore, according to an aspect of the invention, a terminal apparatus for performing radio communication with a base station apparatus, the terminal apparatus including: a receiver which receives an assignment information indicating which of first or second sub-band is assigned to each terminal apparatus, wherein a radio frequency band used for the radio communication is divided into the first and second sub-bands of which respective bandwidths are different, the divided first or second sub-band is assigned for transmitting user data to the terminal apparatus or for transmitting the user data from the terminal apparatus.

Furthermore, according to an aspect of the invention, a radio communication method for a radio communication system for performing radio communication between a base station apparatus and a terminal apparatus, the method including: dividing by the base station apparatus a radio frequency band used for the radio communication into first and second sub-bands of which respective bandwidths are different, and assigning the divided first or second sub-band for transmitting user data to the terminal apparatus or for transmitting the user data from the terminal apparatus, and generating assignment information indicating which of the first or second sub-band is assigned to each terminal apparatus; transmitting by the base station apparatus the assignment information to the terminal apparatus; and receiving by the terminal apparatus the assignment information.

Effectiveness of the Invention

The present invention can provide a radio communication system, a base station apparatus, a terminal apparatus, and a radio communication method for the radio communication system which improve the utilization efficiency of sub-bands. The present invention can also provide a radio communication system and the like which prevent an increase in the information volume of assignment information on the correspondence of a terminal apparatus and sub-bands to be used by the terminal apparatus.

BRIEF DESCRIPTION OF THE DRAWINGS

FIG. 6A to FIG. 6D illustrate another configuration example of a sub-frame.

1: radio communication system, 10: base station apparatus, 11: memory, 12: scheduler, 13: first multiplexer, 14: second multiplexer, 15: third multiplexer, 17: radio transmitter, 18: radio receiver, 19: moving speed estimating section; 20: data decoder, 21: transmitter, 30: terminal apparatus, 31: radio receiver, 32: control signal decoder, 33: data decoder, 34: channel estimating section (moving speed estimating section), 35: evaluation section, 36: bit map definition desired signal generator, 37: fourth multiplexer, 38: fifth multiplexer, 39: radio transmitter, 40: moving speed estimating section, 41: memory, 42: receiver.

BEST MODE FOR CARRYING OUT THE INVENTION

Embodiments of the present invention will now be described.

<First Embodiment>

Figure 1:
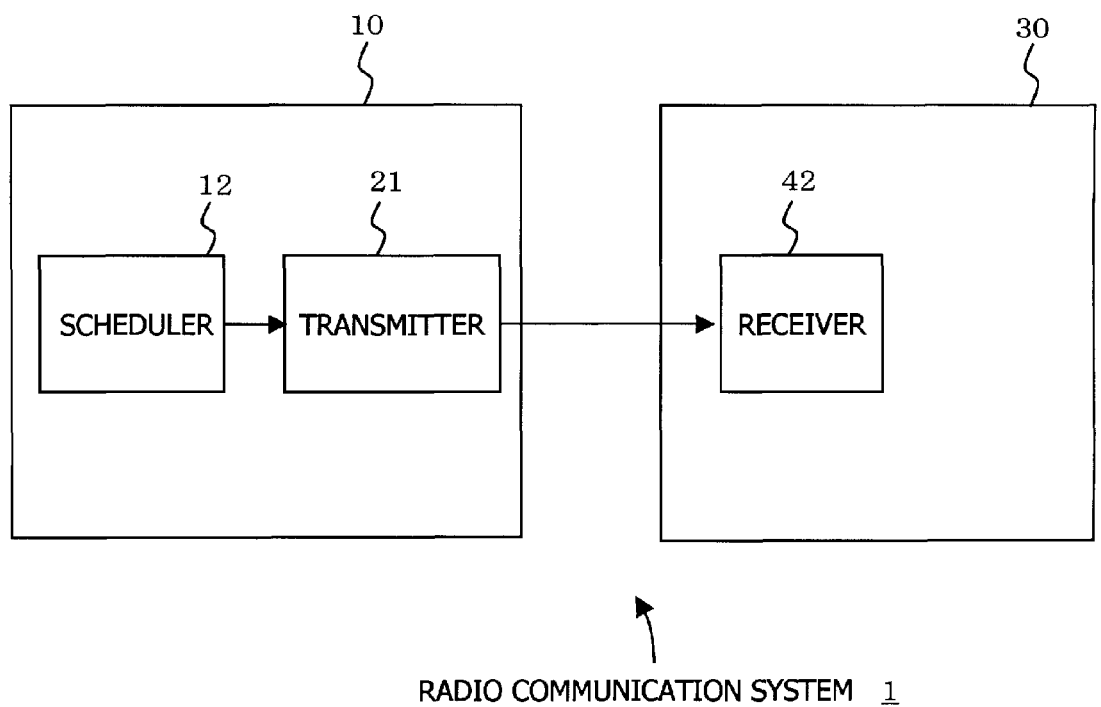
FIG. 1 illustrates a configuration example of a radio communication system.

A first embodiment will be described. FIG. 1 illustrates a configuration example of a radio communication system 1. In the radio communication system 1 which performs radio communication between a base station apparatus and a terminal apparatus, the base station apparatus 10 includes: a scheduler 12 which divides a radio frequency band used for the radio communication into first sub-band and second sub-band of which respective bandwidths are different, assigns the divide first or second sub-band for transmitting the user data to the terminal apparatus 30 or for transmitting the user data from the terminal apparatus 30, and generates assignment information indicating which one of the first and the second sub-bands is assigned to each terminal apparatus 30; and a transmitter 21 which transmits the assignment information to the terminal apparatus 30, and the terminal apparatus 30 includes a receiver 42 which receives the assignment information. Each processing of the base station apparatus 10 and the terminal apparatus 30 is performed, for example, by a processor executing a program stored in a memory.

The scheduler 12 of the base station apparatus 10 assigns each sub-band, divided the radio frequency band into the first sub-band and the second sub-band of which respective bandwidths are different, for transmitting user data to the terminal apparatus 30, or transmitting user data from the terminal apparatus 30. And, the scheduler 12 generates the assignment information indicating which one of the first and second sub-band is assigned for transmitting the user data. The transmitter 21 transmits the assignment information to the terminal apparatus 30.

The terminal apparatus 30 receives the assignment information transmitted from the base station apparatus 10.

Since the respective bandwidths of the first sub-band and the second sub-band assigned for transmitting user data are different, cases when the data volume of the user data becomes sufficiently smaller than the bandwidths of the first or the second sub-band decreases compared with the cases when the bandwidths of the sub-bands are constant. As a consequence, the radio communication system 1 of the present embodiment can increase the utilization efficiency of the sub-bands.

Even if the base station apparatus 10 and the terminal apparatus 30 use sub-bands of which bandwidths are different, the information volume of the assignment information is unchanged unless the total number of sub-bands is changed. Therefore the radio communication system 1 of the present embodiment can prevent an increase of the information volume of the assignment information.

<Second Embodiment>

Figure 2:
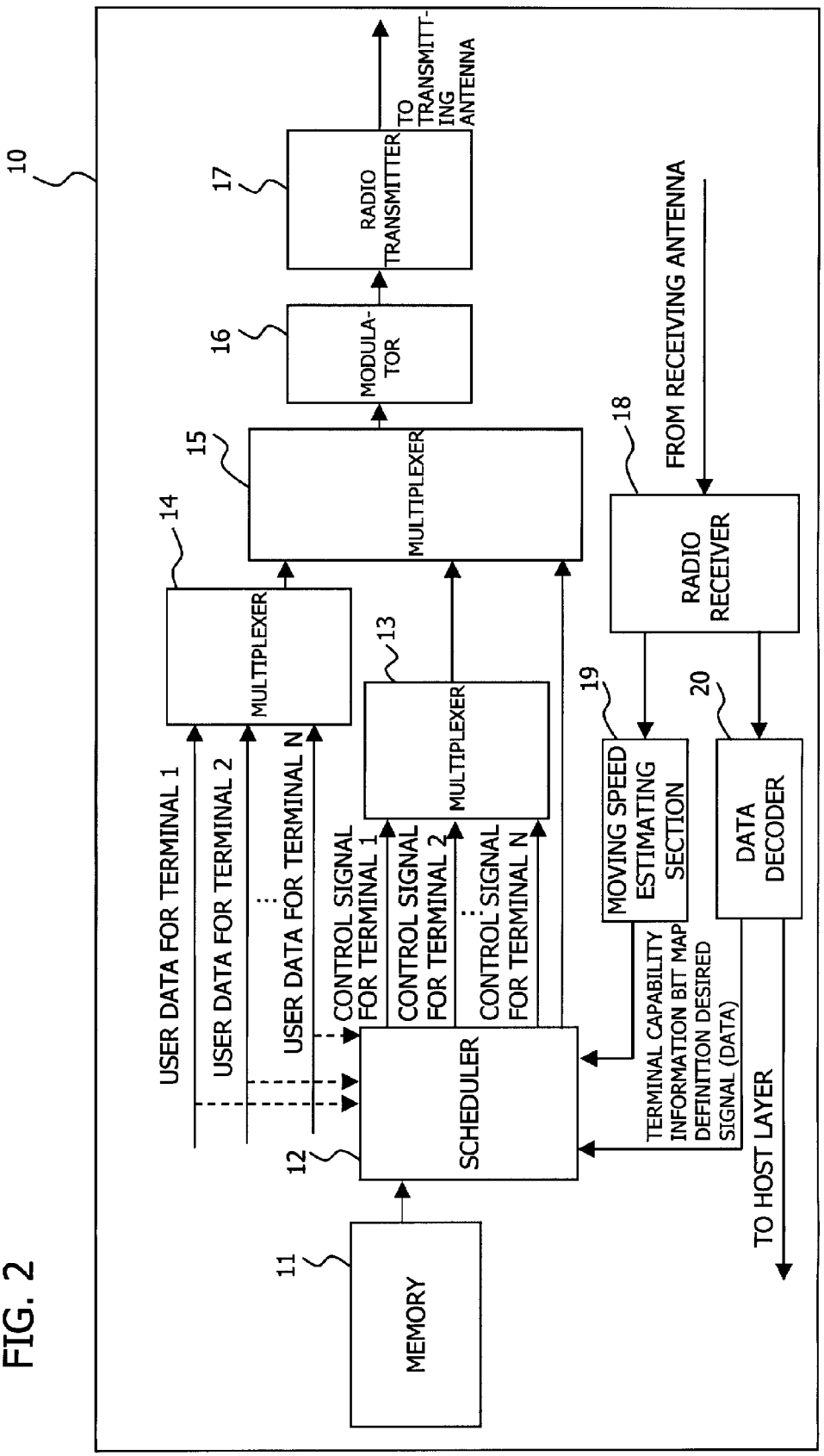
FIG. 2 illustrates a configuration example of a base station apparatus.

FIG. 2 illustrates a configuration example of the base station apparatus (hereafter "base station") 10 in the radio communication system 1. The base station 10 include a memory 11, a scheduler 12, first multiplexer 13, second multiplexer 14, third multiplexer 15, a modulator 16, a radio transmitter 17, a radio receiver 18, a moving speed estimating section 19, and a data decoder 20.

The transmitter 21 in the first embodiment (see FIG. 1) corresponds to the first to third multiplexers 13 to 15, the modulator 16, and the radio transmitter 17, for example.

The memory 11 stores sub-band bit map definition information (hereafter "bit map definition information"). The bit map definition information is information on which a sub-band, out of one or plurality of sub-bands, is used to transmit or receive user data for each terminal apparatus 30 (or assignment information). The sub-band is a minimum frequency band which is assigned to transmit or receive user data to/from a terminal 30, out of the transmission bandwidth of the radio communication system 1. The sub-band includes one or a plurality of sub-carriers. The bit map definition information will be described in detail later.

The scheduler 12 generates a sub-frame (or scheduling information), to indicate which time domain and which frequency band is used to transmit and receive data, for each terminal apparatus (hereafter "terminal") 30, and outputs it to the third multiplexer 15. There are two types of sub-frames: a sub-frame in the downlink direction for transmitting data from the base station 10 to the terminal 30; and a sub-frame in the uplink direction for transmitting data from the terminal 30 to the base station 10.

The scheduler 12 generates a control signal for each terminal 30, and outputs it to the first multiplexer 13. The control signal includes an individual control information including data modulation information, HARQ information, and bit map definition information. For the bit map definition information, the scheduler 12 reads the bit map definition information stored in the memory 11, and includes it in a read control signal. The bit map definition information may be multiplexed in the corresponding user data. In this case, the scheduler 12 outputs the bit map definition information to the second multiplexer 14, and the second multiplexer 14 multiplexes the bit map definition information with user data.

The first multiplexer 13 multiplexes each control signal which is output from the scheduler 12.

The second multiplexer 14 multiplexes user data for each terminal 30. Each user data is transmitted from a host apparatus (or host layer), for example.

The third multiplexer 15 multiplexes information on a sub-frame from the scheduler 12, a control signal which is output from the first multiplexer 13, and data which is output from the second multiplexer 14.

The modulator 16 modulates data which is output from the third multiplexer 15.

The radio transmitter 17 performs processing to assign data which is output from the modulator 16 to a predetermined frequency band and time domain based on the information on the sub-frame, and converts the signal after processing into a radio signal, and outputs the radio signal. The radio signal is transmitted to the terminal 30 via the transmitting antenna.

The radio receiver 18 converts the radio signal from the terminal 30, received via the receiving antenna, into a signal before modulation.

The moving speed estimating section 19 estimates the moving speed of the terminal 30 based on the signal which is output from the radio receiver 18. For example, the moving speed estimating section 19 estimates the moving speed based on the phase change of a pilot signal, which is transmitted from the terminal 30. The moving speed estimating section 19 outputs the estimated moving speed information to the scheduler 12.

The data decoder 20 decodes data from signals which are output from the radio receiver 18. The data decoder 20 outputs a bit map definition desired signal (hereafter "bit map desired signal") transmitted from the terminal 30 to the scheduler 12, and outputs the user data to the host layer. The bit map desired signal is a signal transmitted from the terminal 30 when [user accessing] the terminal 30 wants to change the bit map definition information transmitted to the terminal 30, for example. The details will be described later.

Figure 3:
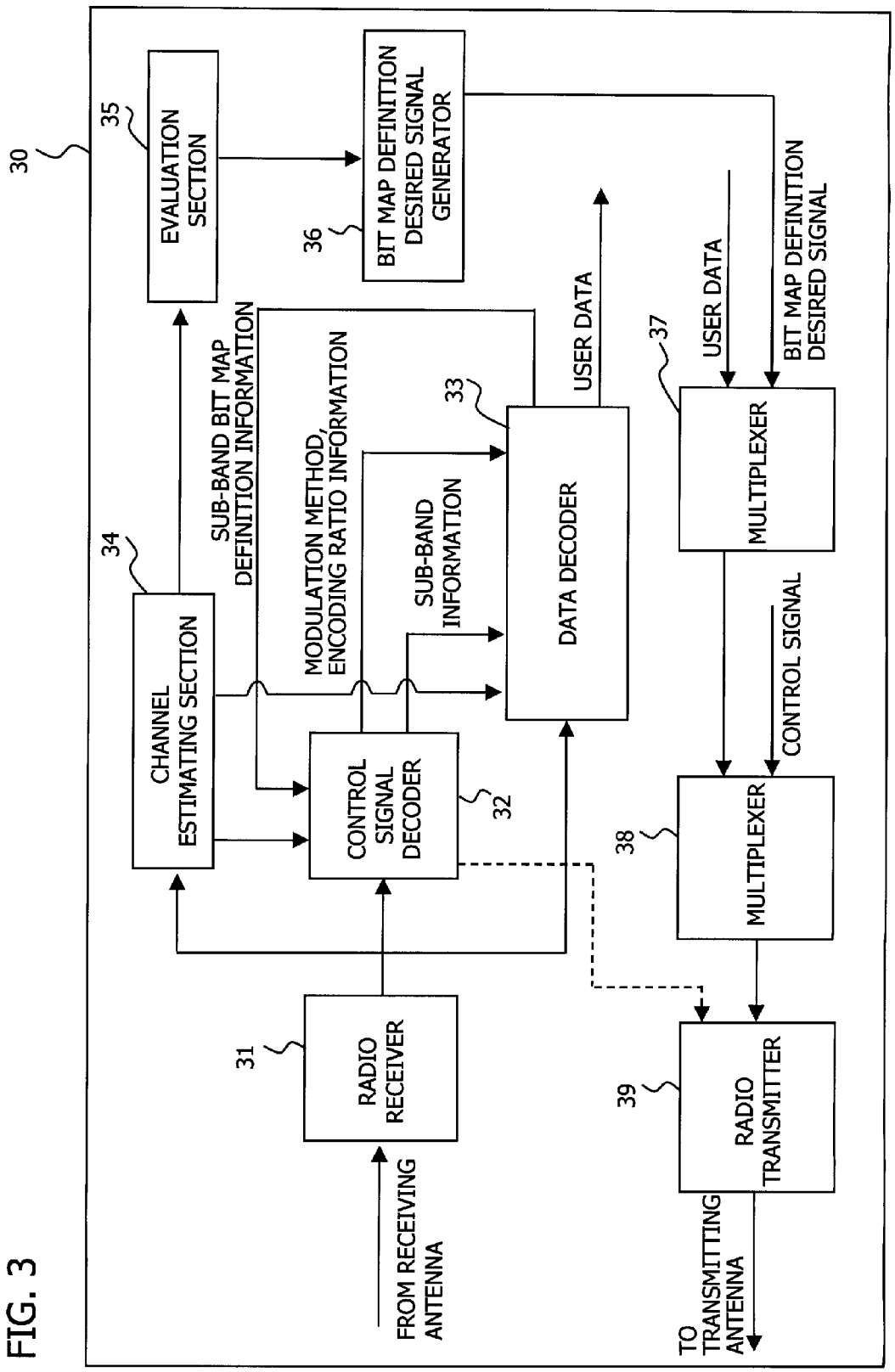
FIG. 3 illustrates a configuration example of a terminal apparatus.

FIG. 3 illustrates a configuration example of the terminal 30. The terminal 30 includes a radio receiver 31, a control signal decoder 32, a data decoder 33, a channel estimating section 34, an evaluation section 35, a bit map definition desired signal generator (hereafter "desired signal generator") 36, fourth multiplexer 37, fifth multiplexer 38 and a radio transmitter 39.

The receiver 42 in the first embodiment (see FIG. 1) corresponds to the radio receiver 31, the control signal decoder 32 and the data decoder 33, for example.

The radio receiver 31 receives radio signals transmitted from the base station 10 via the receiving antenna.

The control signal decoder 32 decodes a control signal for a signal from the radio receiver 31. Based on the bit map definition information included in the control signal, the control signal decoder 32 outputs sub-band information, which indicates a sub-band assigned to the terminal 30, to the data decoder 33. The control signal decoder 32 outputs the modulation method and encoding ratio information included in the control signal to the data decoder 33.

The data decoder 33 extracts the user data addressed to the terminal 30 out of the signal from the radio receiver 31, based on the sub-band information, and demodulates and decodes the user data based on the modulation information and encoding ratio information respectively. The decoded user data is output to other processing units of the terminal 30.

If the bit map definition information is included in the user data, the data decoder 33 may extract the bit map definition information out of the decoded user data, and output the bit map definition information to the control signal decoder 32. In this case, the control signal decoder 32 outputs the sub-band information based on the bit map definition information, which is output from the data decoder 33.

The channel estimating section 34 estimates the channel required for demodulating the receive signals, and measures the quality of the downlink radio line, based on the pilot signal transmitted from the base station 10.

The evaluation section 35 determines whether the bit map definition information is changed or not based on the result of the downlink radio line quality measurement, and if the bit map definition information is changed, the evaluation section 35 outputs the notice thereof to the desired signal generator 36. The evaluation section 35 notifies the change when the estimation result is lower than a threshold, for example.

When the notice on the change is received from the evaluation section 35, the desired signal generator 36 generates a bit map definition desired signal for requesting to change the bit map definition information.

The fourth multiplexer 37 multiplexes user data and a bit map definition desired signal which is output from the desired signal generator 36.

The fifth multiplexer 38 multiplexes a control signal and an output signal which is output from the fourth multiplexer 37.

The radio transmitter 39 performs such processing as encoding, amplitude control and modulation on an output signal which is output from the fifth multiplexer 38, converts the processed signal into a radio signal, and outputs the radio signal to the transmitting antenna. The radio signal is transmitted to the base station 10 via the transmitting antenna.

Operation will now be described. Operation in the downlink direction will be described first.

Figure 4:
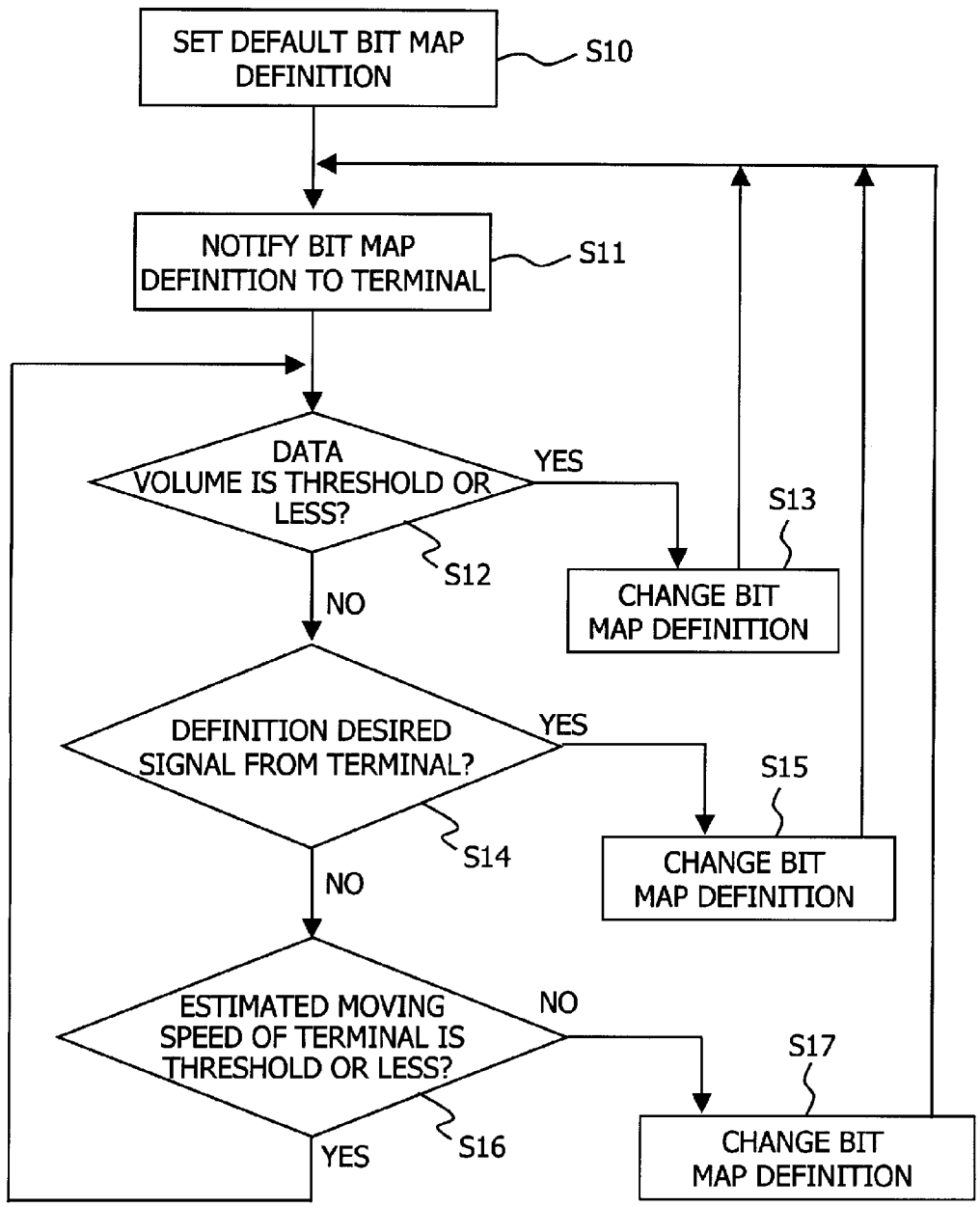
FIG. 4 is a flow chart depicting an operation example.

FIG. 4 is a flow chart depicting an operation example. When the processing starts, the scheduler 12 of the base station 10 generates a control signal by including initial (default) bit map definition information stored in the memory 11 (S10). The scheduler 12 may output the bit map definition information to the second multiplexer 14 so as to be multiplexed with the user data.

Figures 5A, 5B:
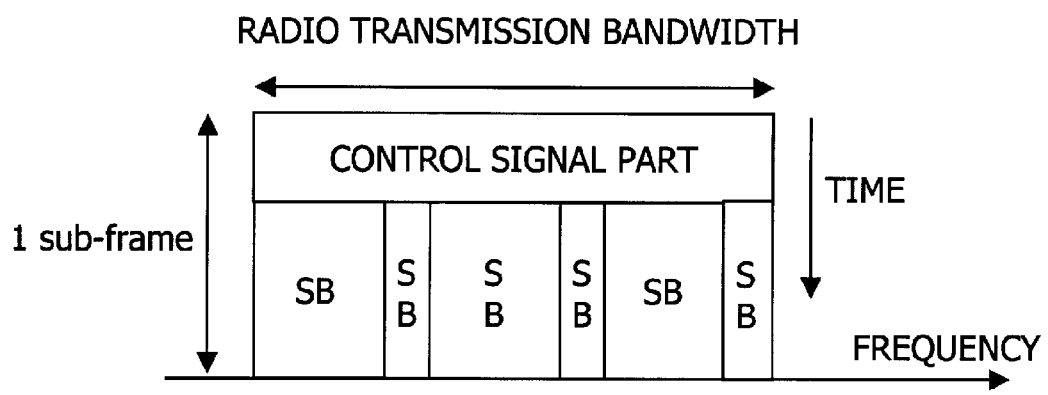
FIG. 5A and FIG. 5B illustrate a configuration example of a sub-frame.

FIG. 5A illustrates a configuration example of a sub-frame, and FIG. 5B is an example of the bit map definition information. In the present embodiment, there are different widths in each sub-band assigned to the terminal 30. In the case of the example in FIG. 5A, two sizes of sub-bands alternately exist in the radio transmission band. Each bit included in the bit map information corresponds to each sub-band. For example, if the sub-band at the left end in FIG. 5A is assigned for the user data for a terminal, the bit map definition information becomes "100000", and if the sub-band second from the left is assigned, the bit map definition information becomes "010000". The scheduler 12 creates the bit map definition information for each terminal 30. In the example in FIG. 5A, two sizes of sub-bands are arrayed, but all the widths of the sub-bands may be different from one another.

In the present embodiment, in the bit map definition information which is used for specifying a sub-band used for transmitting data for each terminal 30, the widths of the sub-bands indicated by each bit are different among bits. Or for the sub-bands generated by dividing the radio transmitting band into different bandwidths, the scheduler 12 generates assignment information to indicate which sub-band is assigned for transmitting the user data for the terminal 30.

Due to this, the possibility of assigning a sub-band having a smaller width than other sub-bands, when the volume of user data for a terminal 30 is smaller than the volume of user data for other terminals, increases, compared with the case when the widths of the sub-bands are constant. If the volume of the user data is larger than the volume of user data for other terminals, a possibility of assigning a sub-band wider than the other sub-bands increases. Therefore in the case of the present embodiment, the utilization efficiency of the sub-band can be increased compared with a case of using sub-bands having a same width. Even if widths of sub-bands are different, the number of bits in the bit map definition information remains the same unless the total number of sub-bands is changed. Therefore according to the present embodiment, an increase of information volume of bit map definition information can be prevented, and utilization efficiency of the sub-bands can be improved.

Referring back to FIG. 4, the base station 10 notifies the created bit map definition information to each terminal 30 (S11). The bit map definition information is included in the control signal, or multiplexed with the user data, and is transmitted to each terminal 30 via the radio transmitter 17.

Then the base station 10 determines whether or not the data volume is a threshold or less (S12). For example, the scheduler 12 inputs user data to the second multiplexer 14, calculates the volume of the user data per unit time, and determines whether the data volume is the threshold or less by the calculated data volume and threshold. As another example, the data decoder 33 of the terminal 30 calculates the decoded data volume per unit time, outputs the result to the radio transmitter 39, and the scheduler 12 determines whether or not the data volume is the threshold or less by the data volume transmitted from the terminal 30.

If the data volume is the threshold or less (YES in S12), the scheduler 12 changes the arrangement pattern of the sub-bands (S13). For example, if the data volume of the user data to be transmitted to a terminal 30 is much smaller than the size of the initially assigned sub-band, the scheduler 12 changes the arrangement of the sub-bands.

For example, the memory 11 or the scheduler 12 stores a plurality of sub-frames or sub-band information having the changed arrangement of the sub-bands. The scheduler 12 changes the bit map definition information by reading sub-frames or sub-band information having an arrangement of sub-bands that is different from S10. In this case, just like the initial bit map definition information which is set in S10, the widths of sub-bands indicated by each bit of the bit map definition information are different among bits. The scheduler 12 may change the arrangement of the sub-bands by changing the total number of sub-bands in the radio transmission band.

FIG. 6A to FIG. 6D illustrate configuration examples of sub-frames in which arrangements of the sub-bands are different from one another. For example, the scheduler 12 uses the sub-frame in FIG. 6A as the initial sub-band, and uses the sub-frame in FIG. 6B by the processing in S13.

As a result, if the second sub-band from the left is assigned to a terminal 30 in FIG. 6A, for example, this sub-band is changed to a sub-band of which width is smaller than the other sub-bands, as depicted in FIG. 6B. Since the sub-band having a width according to the data volume is assigned, the utilization efficiency of the sub-bands can be increased. In the case of using the second sub-band from the left in FIG. 6B for transmitting data in a terminal 30, for example, if receiving characteristics deteriorated with the frequency of this sub-band, data can be transmitted using a sub-band having a different frequency band by changing the arrangement of the sub-bands (e.g. FIG. 6C), hence deterioration of receiving characteristics can be prevented.

The change of the sub-band is transmitted from the scheduler 12 to the terminal 30 via the third multiplexer 15 as the changed sub-frame information (or scheduling information). The data decoder 33 of the terminal 30 can decode user data from the base station 10 based on the changed sub-band information.

Referring back to FIG. 4, when the data volume is the threshold or less (YES in S12), the scheduler 12 determines whether or not a bit map definition desired signal is received from the terminal 30 (S14). The scheduler 12 determines, for example, whether or not a bit map definition desired signal is input from the data decoder 20.

If a bit map definition desired signal is received from the terminal 30 (YES in S14), the scheduler 12 changes the arrangement pattern of the sub-bands (S15). The arrangement pattern can be changed in the same manner as the processing in S13.

The bit map definition desired signal is generated by the evaluation section 35 and the bit map definition desired signal generator 36 based on the result of the channel estimating section 34. If the downlink radio line quality measurement result is smaller than a threshold, the propagation path environment is not good, so the evaluation section 35 notifies the change so that the width of the sub-band becomes wider than the width of the initial sub-band specified by the scheduler 12. Because of the change of the arrangement pattern of the sub-bands, the terminal 30 has a higher possibility of the width of the changed sub-band becoming wider than the width of the initial sub-band. A smaller value can more easily be used for an encoding ratio of the transmission signals, therefore probability for the terminal 30 to receive receiving signals having good receiving characteristics increases, and other receiving signals can be decoded by error correction based on these receiving signals. As a consequence, the terminal 30 can improve the receiving characteristics.

If the bit map definition desired signal is not received from the terminal 30 (NO in S14), the scheduler 12 determines whether the moving speed of the terminal 30 is a threshold or less (S16). The scheduler 12 determines this based on the moving speed information which is output from the moving speed estimating section 19.

If the moving speed is faster than the threshold (NO in S16), the scheduler 12 changes the bit map definition information (S17). The processing for the change is the same as S13 or S15.

For example, if the moving speed of the terminal 30 is faster than the threshold (e.g. during high-speed moving), a possibility that the changed width of the sub-band becomes wider than the initial width of the sub-band increases due to the change of the arrangement pattern of the sub-bands, and the probability to receive a receiving signal having good receiving characteristics increases, just like the case of S15. Therefore the terminal 30 can decode other receive signals using error correction based on this receiving signal, and receiving characteristics can be improved compared with the case of using sub-bands having a same width.

If the moving speed is the threshold or less (YES in S16), on the other hand, processing moves to S12, and the base station 10 repeats the processing in S12 and later.

Now operation in the uplink direction will be described. FIG. 4 is also used as a flow chart depicting operation in the uplink direction. The scheduler 12 reads bit map definition information from the memory 11, and performs scheduling (S10). The bit map definition information is included in a control signal, or is multiplexed with user data and transmitted to the terminal 30. The bit map definition information in this case is for each sub-band in the radio transmission bandwidth in the uplink direction (or sub-frame in the uplink direction).

The control signal decoder 32 of the terminal 30 extracts the sub-band information for the uplink direction out of the bit map definition information included in the control signal, and extracts modulation method information and encoding ratio information for the uplink direction included in the control signal, and outputs them to the radio transmitter 39 respectively. The radio transmitter 39 performs modulation and encoding based on this information, and maps the user data on the frequency axis and time axis, and transmits the mapped user data.

The evaluation section 35, on the other hand, requests the desired signal generator 36 to change the bit map definition information based on the output result from the channel estimating section 34, and based on this request, the desired signal generator 36 generates a bit map definition desired signal. The bit map definition desired signal is multiplexed with the user data, and is transmitted to the base station 10.

Depending on whether or not the data volume per unit time in the uplink direction, which was decoded by the data decoder 20, is a threshold or less (S12), the scheduler 12 of the base station 10 performs processing to change the bit map definition, that is, processing to change the arrangement of the sub-bands (S13). Just like the case of the downlink, the data volume may be the maximum data volume that the terminal 30 can transmit. For example, the terminal 30 includes the maximum data volume of information that can be transmitted in the control signal, and the scheduler 12 of the base station 10 determines whether or not the data volume per unit time in the uplink direction is the threshold or less.

If the bit map definition desired signal is included in the user data decoded by the data decoder 20 (YES in S14), the scheduler 12 changes the arrangement of the sub-bands (S15). The bit map definition desired signal is also processed in the same manner as the case of the downlink, and the evaluation section 35 notifies the generation of the desired signal based on the estimation result of the channel estimating section 34, and this desired signal is generated by the desired signal generator 36, and is transmitted to the base station 10.

If the moving speed of the terminal 30 estimated by the moving speed estimating section 19 is faster than a threshold (YES in S16), the scheduler 12 changes the arrangement of the sub-bands (S17). For the moving speed as well, just like the case of the downlink, the moving speed estimating section 19 of the base station 10 estimates the moving speed of the terminal 30, and the scheduler 12 can determine whether or not the moving speed is faster than the threshold by the estimation result.

The change of arrangement of the sub-bands (S13, S15 and S17) can also be performed in the same manner as the downlink direction. After the change, the changed sub-frame information is transmitted from the base station 10 to the terminal 30, and the control signal decoder 32 of the terminal 30 outputs the sub-band information to the radio transmitting unit 39 out of the decoded control signal. The radio transmitter 39 transmits the user data to the base station 10 via the changed sub-band.

In the configuration example of the sub-frame illustrated in FIG. 5A, the sub-frame specified by the bit map definition information (B0 B1 B2) can represent a sub-frame in the downlink direction, and the sub-frame specified by the bit map definition (B3 B4 B6) can be expressed as respective sub-frames in the uplink direction.

For the uplink direction as well, according to the present embodiment, the widths of the sub-bands indicated by each bit are different among the bits in the bit map definition information which is used for specifying a sub-band used for transmitting data from each terminal 30. Or the scheduler 12 generates assignment information, to indicate which sub-band is assigned for transmitting user data from the terminal 30, for the sub-bands generated by dividing the radio transmission band into different bandwidths.

Due to this, if the data volume of the user data which is transmitted from the terminal 30 is smaller than the data volume to be transmitted from the other terminals, a case may arise where a sub-band having a smaller width than the other sub-bands is assigned, in comparison with the case of using sub-bands having a predetermined width. Therefore the present radio communication system 1 can increase the utilization efficiency of the sub-bands. Since the scheduler 12 can change the arrangement of the sub-bands having different sizes, instead of fixing the arrangement, utilization efficiency of the sub-bands can be further increased. In any case, the number of bits of the bit map definition information remains the same, even if the arrangement of the sub-bands is changed, unless the total number of sub-bands is changed, hence an increase of information volume of the bit map definition information can be prevented.

<Other Embodiments>

Various variant forms can be used to change the arrangement of the sub-bands. For example, the scheduler 12 may change the arrangement pattern of the sub-bands periodically, as illustrated in FIG. 6A to FIG. 6D, regardless the processings in S12, S14 and S16. By this change, if the data volume of user data for a terminal 30 is smaller than that for the other terminals, a possibility to assign a sub-band changed to a smaller band than the other sub-bands and improve utilization efficiency of the sub-bands increases. The change of arrangement of the sub-bands changes a size of each sub-band indicated by each bit of the bit map definition information, but does not change the number of bits, hence the information volume is unchanged.

Even in the case of changing the arrangement pattern of the sub-bands periodically, the scheduler 12 need not use the four types of sub-frames illustrated in FIG. 6A to FIG. 6D, but may use three types or two types out of these four types. Also more types of sub-frames may be used.

In the case of changing the bit map definition information (S12, S14 and S16), the scheduler 12 may change the cycle to change the arrangement pattern, such as changing from four types to three types. For example, if the moving speed of the terminal 30 is faster than a threshold, the scheduler 12 changes the bit map definition information using three types in FIG. 6A to FIG. 6C out of the four types in FIG. 6A to FIG. 6D.

The scheduler 12 may change the arrangement of the sub-bands so that the total number of sub-bands in the transmission band is changed periodically. In the case of changing the bit map definition information (S12, S14 or S16), the scheduler 12 may change the total number of sub-bands.

Figure 7:
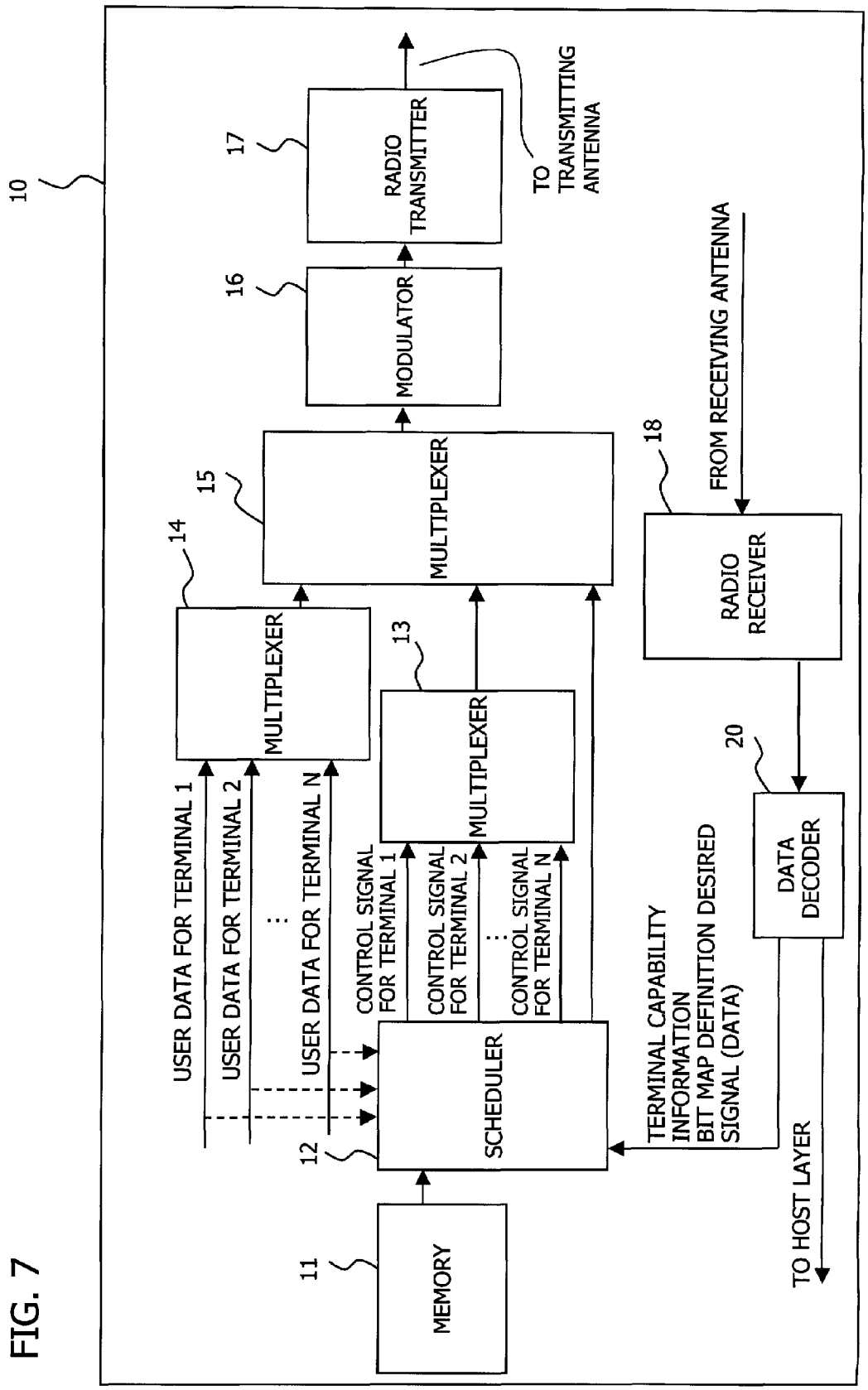
FIG. 7 illustrates another example of a base station apparatus.
Figure 8:
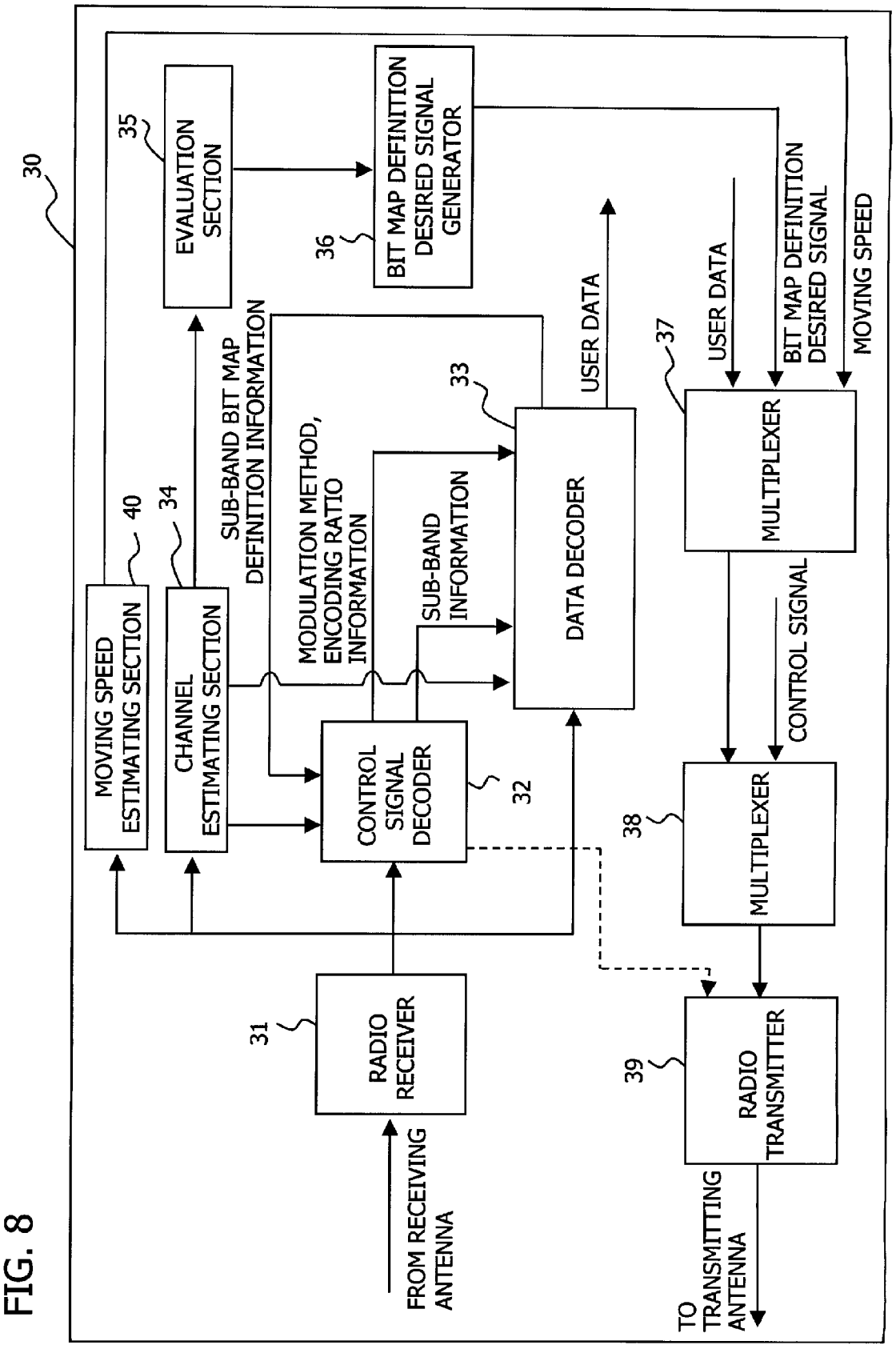
FIG. 8 illustrates another example of a terminal apparatus.

FIG. 7 illustrates another configuration example of the base station 10, and FIG. 8 illustrates that of the terminal 30. FIG. 7 and FIG. 8 are examples when the terminal 30 includes a moving speed estimating section 40.

The moving speed estimating section 40 estimates the moving speed of the terminal 30 based on the phase change of the pilot signals received by the radio receiver 31. For example, just like the moving speed estimating section 19 of the base station 10, the moving speed estimating section 40 sequentially stores the received pilot signals and stores them for a predetermined period, and then estimates the moving speed by calculating the phase change of the pilot signals. The estimated moving speed is multiplexed with the user data by the fourth multiplexer 37, and is transmitted to the base station 10. The data decoder 20 of the base station 10 decodes the moving speed, and outputs it to the scheduler 12. If the moving speed is faster than a threshold (YES in S16), the scheduler 12 changes the arrangement pattern of the sub-bands (S17). The scheduler 12 may periodically change the arrangement pattern of the sub-bands (FIG. 6A to FIG. 6D), or may change the cycle to change the arrangement pattern according to the moving speed. For example, the scheduler 12 may change the four types of sub-frames illustrated in FIG. 6A to FIG. 6D, to three types or two types of sub-frames according to the moving speed.

The moving speed estimating section 40 may output the estimated moving speed to the evaluation section 35. In this case, if the moving speed is faster than a threshold, the evaluation section 35 notifies the change of the bit map definition information to the bit map definition desired signal generator 36. If the bit map definition desired signal is received from the terminal 30 (YES in S14), the scheduler 12 changes the arrangement of the sub-bands (S15). Since the moving speed estimating section 19 is not in the base station 10, the base station 10 can have less processing load.

Figure 9:
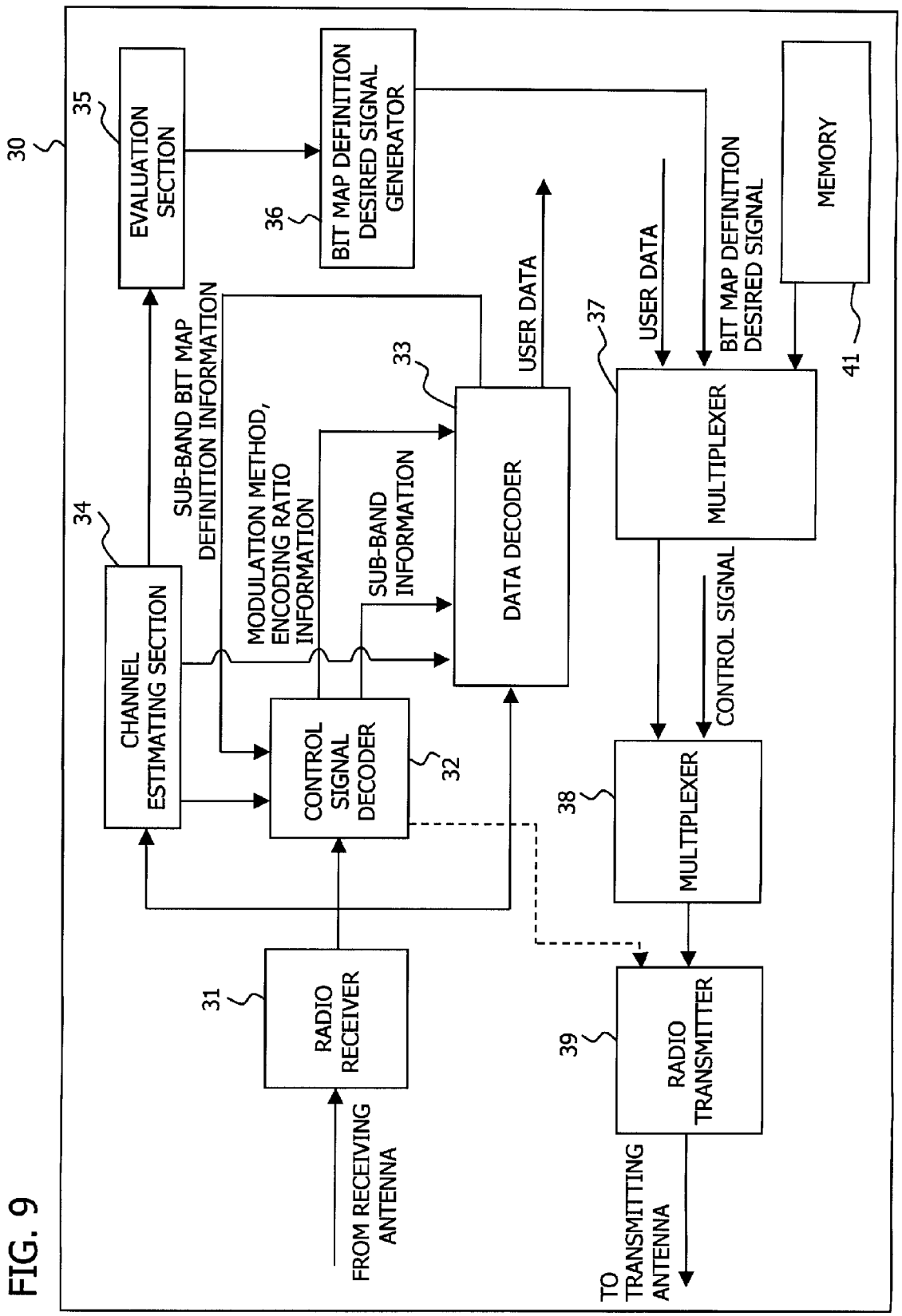
FIG. 9 illustrates another example of a terminal apparatus.
Figure 10A:
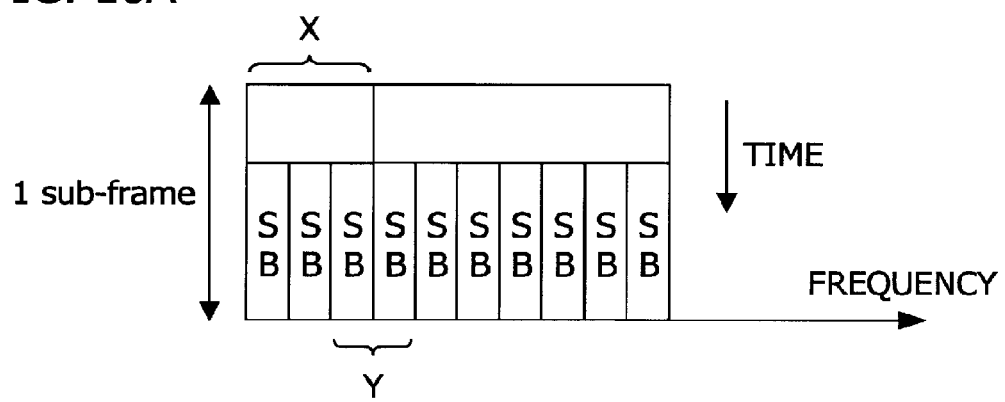
FIG. 10A illustrates a configuration example of a sub-frame.
Figure 10B:
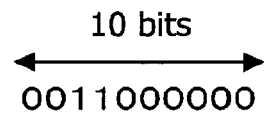
FIG. 10B is an example of a bit map.
Figure 11A:
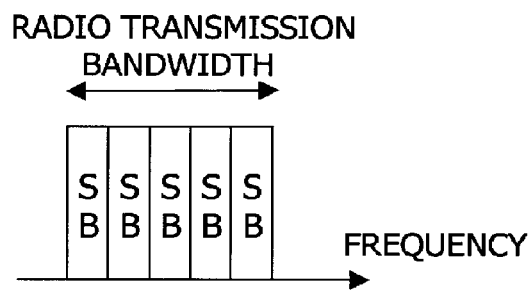
FIG. 11A and FIG. 11B illustrate an example of a relationship of a radio transmission bandwidth and sub-bands.
Figure 11B:
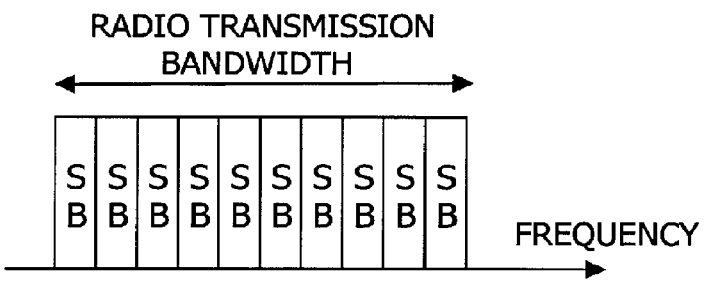
Figure 12A:
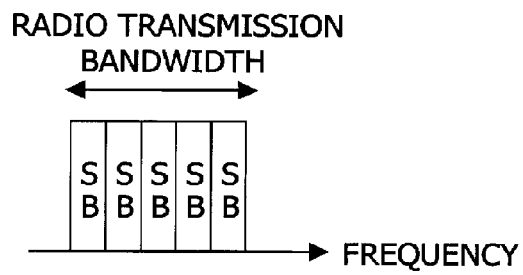
FIG. 12A to FIG. 12C illustrate another example of a relationship of a radio transmission bandwidth and sub-bands.
Figure 12B:
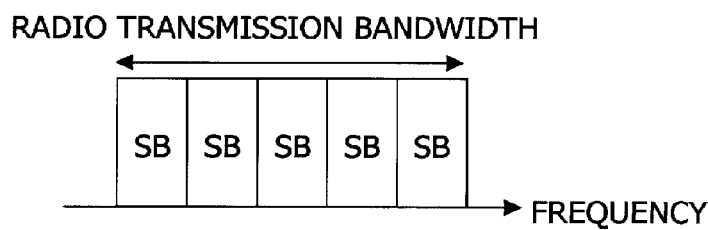
Figure 12C:
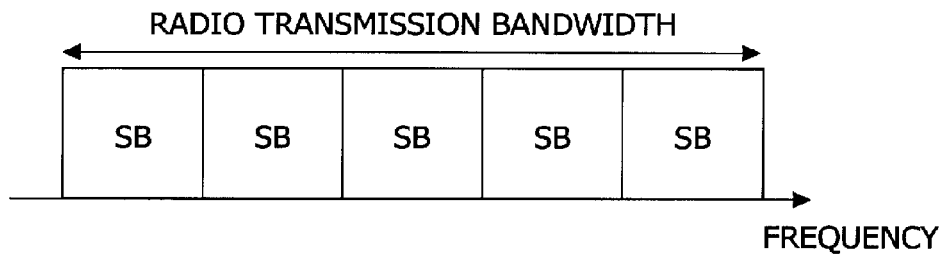

FIG. 9 illustrates another configuration example of the terminal 30. The terminal 30 includes a memory 41 which stores as terminal capability information the maximum size of the receivable data (maximum receivable data volume). The fourth multiplexer 37 multiplexes the user data and the terminal capability information, and outputs the result. The data decoder 20 of the base station 10 (FIG. 2) decodes the terminal capability information, and outputs it to the scheduler 12. If the maximum data volume of the receivable data is a threshold or less (YES in S12), the scheduler 12 performs processing for changing the arrangement of the sub-bands (S13). In this case, the scheduler 12 need not calculate the data volume per unit time of the user data to be transmitted, and the base station can have less processing load. The terminal 30 may include the fifth multiplexer 38 output the terminal capability information, including the terminal capability information in the control signal, and transmit it.

In the above mentioned example, the arrangement pattern is changed based on the data volume, bit map definition desired signal and the moving speed of the terminal 30 (S12 to S17 in FIG. 4). For example, the arrangement pattern may be changed according to the type of the user data which the base station 10 transmits. The scheduler 12 may input the user data from a host apparatus, and if the type of the user data is voice data, FTP (File Transfer Protocol), HTTP data or the like, the arrangement pattern can be changed (S13, S15, S17). For example, the scheduler 12 may determine the type of the user data based on a user data type information included in the user data, or may determine the type of the user data by user data type information notified by the host apparatus. In this case as well, the above mentioned various variant forms can be used. In this example as well, the arrangement of the sub-bands is changed according to the user data volume, hence utilization efficiency of the sub-bands can be improved.

The invention claimed is:

1. A radio communication system comprising:
a base station apparatus; and
a terminal apparatus, wherein
the base station apparatus and terminal apparatus performs radio communication,
the base station apparatus includes:
a scheduler configured to divide each of a plurality of radio frequency bands used for the radio communication between the base station apparatus and respective ones of terminal apparatuses into first and second sub-bands of which respective bandwidths are different; configured to notify respective terminal apparatuses, individually or all the terminal apparatuses commonly at the same time or in advance, of bit map definition information that indicates how the radio frequency band is divided; configured to assign one or both of the divided first or second sub-band for transmitting user data to the terminal apparatus or for transmitting the user data from the terminal apparatus; and configured to generate assignment information as part of the bit map definition information indicating which one of the first or second sub-bands is assigned to each terminal apparatus; and
a transmitter configured to transmit the assignment information to the terminal apparatus, and
the terminal apparatus includes:
a receiver configured to receive the assignment information.

2. The radio communication system according to claim 1, wherein the scheduler is further configured to change arrangement of the first and second sub-bands in the radio frequency band based on a data volume of the user data to the terminal apparatus or a data volume of the user data from the terminal apparatus, and to assign the changed first or second sub-band for transmitting the user data.

3. The radio communication system according to claim 1, wherein
the terminal apparatus further includes a transmitter configured to generate a request signal for requesting change of the arrangement of the first and second sub-bands and transmits the request signal,
the base station apparatus further includes a receiver configured to receive the request signal, and
the scheduler is further configured to change the arrangement of the first and second sub-bands in the radio frequency band according to the request signal, and to assign the changed first or second sub-band for transmitting the user data.

4. The radio communication system according to claim 3, wherein
the terminal apparatus further includes a channel estimating section configured to estimate a channel based on a pilot signal transmitted from the base station apparatus, and
the transmitter of the terminal apparatus is further configured to generate the request signal based on an estimation result output from the channel estimation unit.

5. The radio communication system according to claim 1, wherein
the scheduler is further configured to change the arrangement of the first and second sub-bands in the radio frequency band based on a moving speed of the terminal apparatus, and to assign the changed first or second sub-band for transmitting the user data.

6. The radio communication system according to claim 1, wherein the scheduler is further configured to change the arrangement of the first and second sub-bands in the radio frequency band in every transmitting block and to assign the changed first or second sub-band for transmitting the user data.

7. The radio communication system according to claim 6, wherein the scheduler is further configured to change the arrangement of the first and second sub-bands in every transmitting block at a predetermined cycle.

8. The radio communication system according to claim 7, wherein the scheduler is further configured to change the cycle of changing the arrangement of the first and second sub-bands according to the moving speed of the terminal apparatus.

9. The radio communication system according to claim 1, wherein the scheduler is further configured to change the arrangement of the first and second sub-bands in the radio frequency band based on a type of data transmitting to the terminal apparatus or a type of data to be transmitted by the terminal apparatus, and to assign the changed first or second sub-band for transmitting the user data.

10. The radio communication system according to claim 1, wherein the scheduler is further configured to change the arrangement of the first and second sub-bands in the radio frequency band based on a maximum data volume of the user data which the terminal apparatus can receive or the terminal apparatus can transmit, and to assign the changed first or second sub-band for transmitting the user data.

11. A base station apparatus for performing radio communication with a terminal apparatus, the base station apparatus comprising:

a scheduler configured to divide each of a plurality of radio frequency bands used for the radio communication between the base station apparatus and respective ones of terminal apparatuses into first and second sub-bands of which respective bandwidths are different; configured to notify respective terminal apparatuses, individually or all the terminal apparatuses commonly at the same time or in advance, of bit map definition information that indicates how the radio frequency band is divided; configured to assign one or both of the divided first or second sub-band for transmitting user data to the terminal apparatus or for transmitting the user data from the terminal apparatus; and configured to generate assignment information as part of the bit map definition information indicating which one of the first or second sub-bands is assigned to each terminal apparatus; and a transmitter configured to transmit the assignment information to the terminal apparatus.

12. A terminal apparatus for performing radio communication with a base station apparatus, wherein the base station apparatus is configured to communicate with at least one other terminal apparatus, the terminal apparatus comprising:

a receiver configured to receive an assignment information indicating which one of first or second sub-bands is assigned to each terminal apparatus, wherein in the base station, a radio frequency band used for the radio communication is divided into first and second sub-bands of which respective bandwidths are different, wherein bit map definition information indicating how the radio frequency band is divided is notified to respective terminal apparatuses individually or all the terminal apparatuses commonly at the same time or in advance, the bit map definition information further indicating how one or both of the divided first or second sub-band for transmitting user data to the terminal apparatus or for transmitting the user data from the terminal apparatus is assigned.

13. A radio communication method for a radio communication system for performing radio communication between a base station apparatus and a terminal apparatus, the method comprising:

dividing by the base station apparatus a radio frequency band used for the radio communication into first and second sub-bands of which respective bandwidths are different, notifying respective terminal apparatuses individually or all the terminal apparatuses commonly at the same time or in advance, bit map definition information to indicate how the radio frequency band is divided, assigning one or both of the divided first or second sub-band for transmitting user data to the terminal apparatus or for transmitting the user data from the terminal apparatus, generating assignment information of a bit map indicating which one of the first or second sub-band is assigned to each terminal apparatus;

transmitting by the base station apparatus the assignment information to the terminal apparatus; and receiving by the terminal apparatus the assignment information.

\* \* \* \* \*